US010011441B2

(12) United States Patent  (10) Patent No.: US 10,011,441 B2
Chiu  (45) Date of Patent: Jul. 3, 2018

(54) SYSTEM AND METHOD AND APPARATUS FOR MAINTAINING A PRESSURE BALANCE IN A SOLIDS FLOW LOOP AND FOR CONTROLLING THE FLOW OF SOLIDS THERETHROUGH

(71) Applicant: General Electric Technology GmbH, Baden (CH)

(72) Inventor: Jonq-Hai Chiu, West Hartford, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 15/086,914

(22) Filed: Mar. 31, 2016

(65) Prior Publication Data

US 2017/0283191 A1  Oct. 5, 2017

(51) Int. Cl.

| B65G 53/40 | (2006.01) |
| B65G 53/60 | (2006.01) |
| B65G 53/18 | (2006.01) |
| F23C 10/10 | (2006.01) |
| B01J 8/38 | (2006.01) |
| B01J 8/00 | (2006.01) |
| F23C 10/26 | (2006.01) |
| F23C 10/32 | (2006.01) |

(52) U.S. Cl.
CPC ............ *B65G 53/60* (2013.01); *B01J 8/0025* (2013.01); *B01J 8/388* (2013.01); *B65G 53/18* (2013.01); *F23C 10/10* (2013.01); *F23C 10/26* (2013.01); *F23C 10/32* (2013.01); *F23C 2900/10008* (2013.01)

(58) Field of Classification Search
CPC ......... B65G 53/60; B65G 53/18; F23C 10/10; C10G 11/187

USPC ............ 406/109, 106, 86, 89, 168; 208/164
See application file for complete search history.

(56) References Cited

U.S. PATENT DOCUMENTS

| 4,032,305 A | 6/1977 | Squires |
| 4,931,260 A * | 6/1990 | Molerus .................. B01J 8/388 34/591 |

(Continued)

FOREIGN PATENT DOCUMENTS

| WO | 9828570 A1 | 7/1998 |
| WO | 2008112345 A1 | 9/2008 |
| WO | 2010063923 A2 | 6/2010 |

OTHER PUBLICATIONS

Search Report and Written Opinion issued from corresponding PCT Application No. PCT/EP2017/057048 dated Jun. 19, 2017.

*Primary Examiner* — William R Harp
(74) *Attorney, Agent, or Firm* — GE Global Patent Operation; Stephen G. Midgley (57) ABSTRACT

A system includes a standpipe for receiving a flow of solids therethrough, the standpipe having at least one inlet configured to receive a gas for decreasing a solids-to-gas ratio of the flow, a sealpot having an inlet fluidly coupled to the standpipe and an outlet fluidly coupled to a riser, the sealpot being configured to fluidize the solids received from the standpipe and to transport the solids to the riser, and a drain device fluidly coupled to an outlet in the standpipe, the outlet being located upstream from the inlet of the sealpot. The drain device is configured to remove the excess gas from the flow of solids within the standpipe to increase the solids-to-gas ratio of the flow prior to the solids entering the sealpot.

15 Claims, 3 Drawing Sheets

(56) References Cited

U.S. PATENT DOCUMENTS

| | | | |
|---|---|---|---|
| 5,078,100 A * | 1/1992 | Huschauer | F22B 31/0084 110/190 |
| 5,376,261 A * | 12/1994 | Avidan | C10G 11/18 208/150 |
| 5,682,828 A * | 11/1997 | Phalen | F23C 10/10 110/245 |
| 6,269,778 B1 | 8/2001 | Anderson et al. | |
| 7,875,249 B2 * | 1/2011 | Murakami | B01J 8/0015 110/245 |
| 9,163,830 B2 | 10/2015 | Chiu et al. | |

* cited by examiner

SYSTEM AND METHOD AND APPARATUS FOR MAINTAINING A PRESSURE BALANCE IN A SOLIDS FLOW LOOP AND FOR CONTROLLING THE FLOW OF SOLIDS THERETHROUGH

GOVERNMENT RIGHTS

This invention was made with Government support under Cooperative Agreement DE-FE0009484 awarded by the Department of Energy. The Government has certain rights in this invention.

BACKGROUND

Technical Field

Embodiments of the invention relate generally to power generation and, more particularly, to a system, method and apparatus for maintaining a pressure balance and for controlling the flow of solids in a solids flow loop of a power generation system.

Discussion of Art

Fluidized bed combustion (FBC) is a combustion technology used in power plants, primarily to burn solid fuels. FBC power plants are more flexible than conventional power plants in that they can be fired on coal, coal waste or biomass, among other fuels. The term FBC covers a range of fluidized bed processes, including circulating fluidized bed (CFB) boilers, bubbling fluidized bed (BFB) boilers and other variations thereof. In an FBC power plant, fluidized beds suspend solid fuels on upward-blowing jets of air during the combustion process in a combustor, causing a tumbling action which results in turbulent mixing of gas and solids. The tumbling action, much like a bubbling fluid, provides a means for more effective chemical reactions and heat transfer in the combustor.

During the combustion process of fuels which have a sulfur-containing constituent, e.g., coal, sulfur is oxidized to form primarily gaseous $SO_2$. In particular, FBC reduces the amount of sulfur emitted in the form of $SO_2$ by a desulfurization process. A suitable sorbent, such as limestone containing $CaCO_3$, for example, is used to absorb $SO_2$ from flue gas during the combustion process.

To further increase utilization of the fuel and efficiency of sulfur capture, a cyclone separator is typically used to separate solids, e.g., unutilized fuel and/or limestone, entrained in flue gas leaving the combustor. The separated solids are then returned to the combustor via a recirculation means, e.g., a recirculation pipe, to be used again in the combustion process. A sealpot, sometimes referred to as a "j-valve," maintains a seal between the combustor and the cyclone separator to prevent unwanted escape of flue gas from the combustor backward, e.g., in a direction opposite to flow of the separated solids into the combustor, through the recirculation pipe.

In connection with the above, maintaining a pressure balance on opposite sides of the sealpot (i.e., between a dipleg/standpipe and riser) is critical for maintaining a positive flow of solids back to the combustor and preventing backflow through the sealpot. In addition, maintaining such pressure balance is necessary to prevent compressive or expansive forces on the transport airbed of the sealpot, which could inhibit precise flow control of the solids, leading to overall system inefficiencies.

Similar considerations are also necessary in chemical looping systems. Chemical looping systems utilize a high temperature process, whereby solids such as calcium or metal-based compounds, for example, are "looped" between a first reactor, called an oxidizer, and a second reactor, called a reducer. In the oxidizer, oxygen from air injected into the oxidizer is captured by the solids in an oxidation reaction. The captured oxygen is then carried by the oxidized solids to the reducer to be used for combustion and/or gasification of a fuel such as coal. After a reduction reaction in the reducer, the solids products from reactions including unused oxygen carrier, are returned to the oxidizer to be oxidized again, and the cycle repeats. In such systems, a sealpot may be utilized to preserve a required pressure seal and prevent an undesired pressure differential that could cause backflow, as discussed above. For example, a sealpot may be utilized in between the output of the oxidizer and the input of the reducer to provide a flow of oxidized solids to be transported to the reducer and prevent backflow therefrom. Like the systems described above a pressure balance must be maintained on opposite sides of the sealpot to maintain positive solid flow and to prevent backflow of solids.

With existing systems, however, flow control of the solids has proven challenging, impacting overall system performance and efficiency. In particular, it has been difficult to avoid clogging of the solids and gas entrained without losing control over the flow of the solids within the sealpot and from the sealpot. In view of the above, there is a need for a system, apparatus and method for balancing the pressure between a seal leg and a riser leg of a solids flow loop in order to more precisely control the flow of solids therethrough.

BRIEF DESCRIPTION

In an embodiment, a system is provided. The system includes a standpipe for receiving a flow of solids therethrough, the standpipe having at least one inlet for solids configured to receive a gas for decreasing a solids-to-gas ratio of the flow, a sealpot having an inlet fluidly coupled to the standpipe and an outlet fluidly coupled to a riser, the sealpot being configured to fluidize the solids received from the standpipe and to transport the solids to the riser, and a drain device fluidly coupled to an outlet in the standpipe, the outlet being located upstream from the inlet of the sealpot. The drain device is configured to remove the gas from the flow of solids within the standpipe to increase the solids-to-gas ratio of the flow prior to the solids entering the sealpot.

In another embodiment, a system for pressure balancing and controlling the flow of solids within a solids flow loop of a power plant is provided. The system includes a downcomer standpipe having an upper end, which receives solids from upstream devices, a lower end, an inlet intermediate the upper end and the lower end and configured to receive a gas for passage into the flow of solids within the standpipe, and an outlet intermediate the inlet and the lower end of the standpipe, a sealpot having an inlet fluidly coupled to the lower end of the standpipe and an outlet fluidly coupled to a discharge passageway, the sealpot being configured to receive the solids from the lower end of the standpipe and to transport the solids to the discharge passageway, and a drain device fluidly coupled to the outlet in the standpipe and being configured to facilitate removal of the gas from the flow of solids within the standpipe.

In yet another embodiment, a method of pressure balancing and controlling the flow of solids within a solids flow loop is provided. The method includes the steps of providing a supply of gas to a standpipe at an inlet to facilitate a flow of solids through the standpipe, removing at least a portion of the gas from the standpipe at an outlet positioned downstream from the inlet, and, after removing the gas from the standpipe, delivering the solids to a sealpot.

DRAWINGS

The present invention will be better understood from reading the following description of non-limiting embodiments, with reference to the attached drawings, wherein below.

DETAILED DESCRIPTION

Reference will be made below in detail to exemplary embodiments of the invention, examples of which are illustrated in the accompanying drawings. Wherever possible, the same reference characters used throughout the drawings refer to the same or like parts. While embodiments of the invention are suitable for use in connection with chemical reaction processes including power generation processes that utilize FBC and/or chemical looping, embodiments of the invention may also be applicable for use in other types of chemical reaction systems including power generation systems and processes. In addition, it is contemplated that embodiments of the invention may be utilized in any system where pressure balance and control over flow of a material is desired, including systems not related to power generation.

As used herein, "operatively coupled" refers to a connection, which may be direct or indirect. The connection is not necessarily a mechanical attachment. As used herein, "fluidly coupled" or "fluid communication" refers to an arrangement of two or more features such that the features are connected in such a way as to permit the flow of fluid between the features and permits fluid transfer. As used herein, "solids" means solid particles intended for use in a combustion process or a chemical reaction such as, for example, coal particles or a metal oxide (e.g., calcium).

Figure 1:
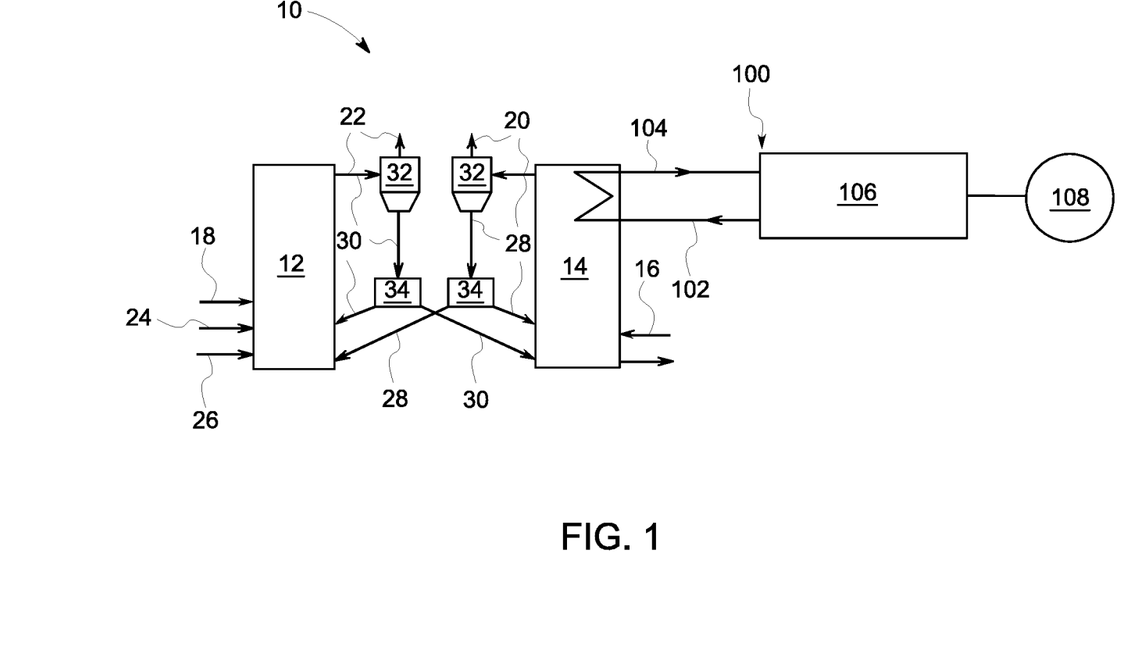
FIG. 1 is a schematic illustration of a chemical looping system, according to an embodiment of the invention.

Embodiments of the invention relate to a system, method and apparatus for controlling the flow of solids and, more particularly, for maintaining a pressure balance within a solids flow loop so that flow control of the solids may be maintained. Referring to FIG. 1, a typical calcium-based chemical looping system 10 of a chemical looping-based power plant according to an exemplary embodiment is illustrated. While the solids utilized within system 10 are described herein as being calcium-based solids, other solids (e.g., other metal oxides) may be utilized to carry oxygen without departing from the broader aspects of the present invention.

As shown in FIG. 1, the system 10 includes a first loop having a reducer 12, and a second loop having an oxidizer 14. Air 16 is supplied to the oxidizer 14, and calcium sulfide (CaS) is oxidized therein to produce a calcium sulfate ($CaSO_4$). The $CaSO_4$ is supplied to the reducer 12, and acts as a carrier to deliver oxygen and heat to fuel 18 (such as coal, for example) supplied to the reducer 12. As a result, the oxygen delivered to the reducer 12 interacts with the coal 18 in the reducer 12. Reduced CaS, is then returned to the oxidizer 14 to again be oxidized into $CaSO_4$, and the cycle described above repeats. Flue gas including nitrogen gas ($N_2$) 20, extracted from the oxidizer by a gas/solids separation device such as a cyclone, as well as heat resulting from the oxidation, exit the oxidizer 14 through a standpipe and seal device to either return to the oxidizer or reducer. Likewise, a gas 22 produced during reduction in the reducer 12 exits the reducer 12.

As shown in FIG. 1, while air 16 is supplied to the oxidizer 14, as described above, waste 20 such as ash and/or excess calcium sulfate ($CaSO_4$), are removed from the oxidizer 14 for disposal in an external facility (not shown). The coal 18, as well as calcium carbonate ($CaCO_3$) 24 and recirculated steam 26, are supplied to the reducer 12 for a reduction reaction therein.

In operation, a series reduction reaction occurs among oxygen from the oxygen carrier and the coal 18, the $CaCO_3$ 24, and $CaSO_4$ 28, and produces calcium sulfide (CaS) 30, which is separated by a gas/solids separator 32, such as a cyclone separator 32, and is thereafter supplied to the oxidizer 14 through a seal pot control valve (SPCV) 34. A portion of the CaS and other solids 30, based upon CL plant load, for example, is recirculated to the reducer 12 by the SPCV 34, as shown in FIG. 1. In addition, the separator separates the gas 22, e.g., $CO_2$, from the CaS 30.

The CaS 30 is oxidized in an oxidation reaction in the oxidizer 14, thereby producing the CaSO4 28 which is separated from flue gas 20 by the separator 32 and is supplied back to the reducer 12 via a SPCV 34. A portion of the CaSO4 28 and CaS may be recirculated back to the oxidizer 14 by the SPCV 34 based upon CL plant load, for example. The oxidation reaction also produces heat which can be utilized in other processes. For example, as illustrated in FIG. 1, in an embodiment, a thermal loop 100 may be integrated with the system 10 to generate power. In particular, the heat produced by the oxidation reaction can be utilized in a steam/water generating device 102 to generate steam 104 which is then used to drive a steam turbine 106 which, in turn, drives a power generator 108.

Figure 2:
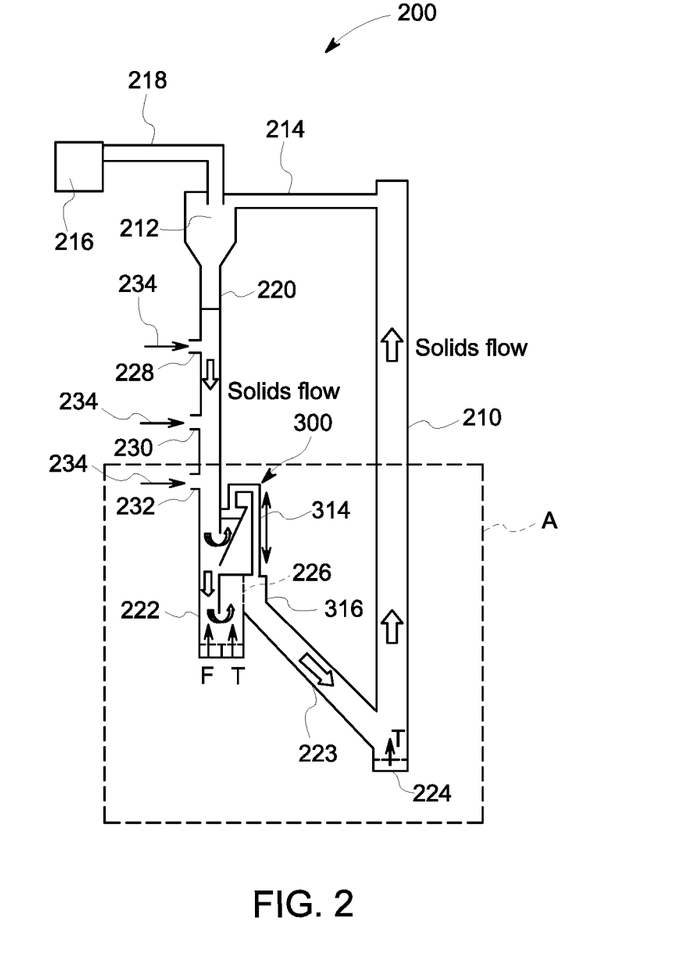
FIG. 2 is a simplified schematic illustration of a solids flow loop of the chemical looping system of FIG. 1.

Turning now to FIG. 2 a solids flow loop 200 of the system 10 is illustrated. In an embodiment, the solids flow loop 200 circulates solids, e.g., $CaSO_4$, within the system 10, e.g., from the oxidizer to the reducer. As shown therein, the flow loop 200 includes a riser 210 fluidly coupled to a solids separator 212 via a separator inlet duct 214. As discussed above, the separator 212 is configured to separate solids from the flue gas. In an embodiment, the separator 212 may be a cyclone separator or other device capable of separating gas from solids. The gas is permitted to exit the loop 200 and enter a pollution/emissions control device 216 through exit duct 218, where it may be further cleaned, where heat may be recovered therefrom, or where it may be utilized in a further chemical reaction.

The separated solids are passed downwardly from the separator 212 through a dipleg or standpipe 220 (also referred to more generally as a feedpipe, and used interchangeably herein). From the standpipe 220, the solids then enter a sealpot 222 (also known as a seal pot control valve) where fluidizing air, F, is utilized to fluidize the solids, and transport air, T, is utilized to move the solids through the sealpot 222 into a return leg 223, and into transport bed 224 of the riser 210. Transport gas from the gas plenum or header is utilized to move the solids up the riser 210 so that they may be distributed for further use, for example, in a subsequent chemical process, as discussed above. As is known in the art, the sealpot control valve 222 functions to prevent backflow due to any pressure differences that may be present between the riser 210 and the standpipe 220.

In an embodiment, the sealpot control valve 222 may be constructed and may operate as disclosed in U.S. Pat. No. 9,163,830, which is incorporated by reference herein in its entirety. As disclosed therein, the sealpot control valve 222 may include an orifice plate 226 having a plurality of apertures therein. The fluidizing gas, the transport gas and the orifice plate 224 are utilized to control the flow rate of the solids through the sealpot control valve 222 as disclosed in the '830 patent, in order to prevent backflow through the sealpot 222.

As also illustrated in FIG. 2, in an embodiment, the standpipe 220 may include a plurality of inlets 228, 230, 232 through which a gas or air 234 (referred to as "grease gas") may be provided to the standpipe 220 to facilitate the flow of solids therethrough by decreasing the solids-to-gas ratio. However, gas entrained in the standpipe 220, if without proper control, may prevent solids from effectively exiting the sealpot control valve 222 smoothly and cause a plug or clog within the standpipe 220, preventing efficient operation of the system 200. For example, in an embodiment, pressure friction may result from the buildup of pressure in the standpipe 220 and may restrict the flow rate through the sealpot control valve 222. The controlled injection of grease gas 234 into the standpipe 220 at various points along its length serves to decrease the pressure friction gas and solids and gas and the standpipe wall to facilitate the flow of solids therethrough.

The injection of too much grease gas 234 into the standpipe 220, however, may increase the flow rate of the solids to a critical point of fluidization where the flow cannot be controlled as needed. This may not be undesirable with a flow rate controlled system, as the ability to precisely control the flow solids is critical in obtaining efficient chemical reactions and/or combustion. (Similar to grease gas 234, gas generated in the standpipe acts like a grease gas).

Figure 3:
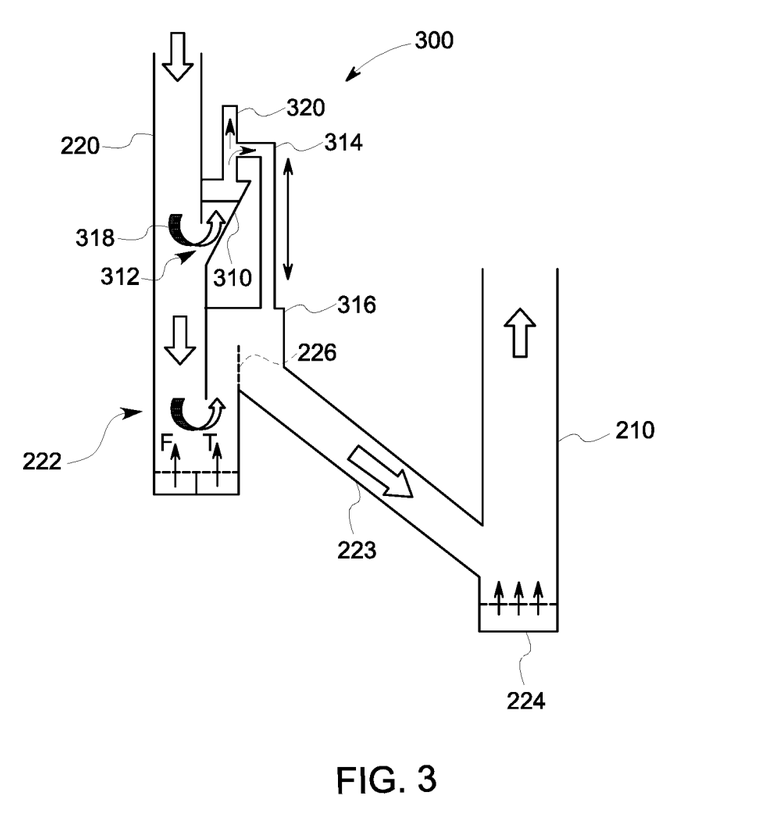
FIG. 3 is a detail view of area A of FIG. 2, illustrating a pressure balancing and flow control system according to an embodiment of the invention.
Figure 4:
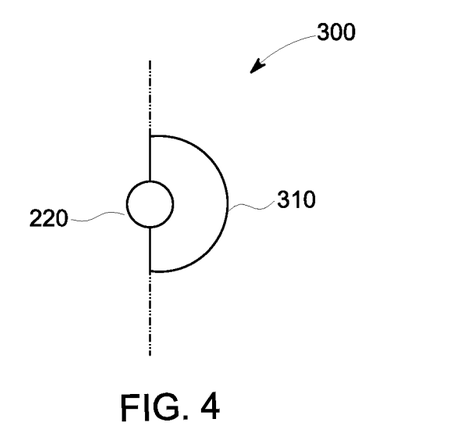
FIG. 4 is a top, cross-sectional view of a portion of the pressure balancing and flow control system of FIG. 3.

With reference to FIG. 3, the solids flow loop 200 therefore includes an apparatus defining a drain device 300 configured to remove the grease air 234 from the flow at a point downstream from where it was injected into the standpipe 220, in order reduce the gas content of the solids flow, so that the solids flow will be maintained in a controllable range. In particular, while the grease air 234 is utilized to facilitate the flow of solids through the standpipe 220 (i.e., to keep the solids moving), apparatus/drain device 300 is configured to remove the excess gas or air 234 at a lower portion of the standpipe 220 to increase the solids-to-gas ratio in order bring the flow rate of solids back within a preferable operating range of the sealpot control valve 222.

As illustrated in FIG. 3, in an embodiment, the apparatus/drain device 300 includes a generally inverted, conical manifold 310 fluidly coupled to an outlet 312 in a lower portion of the standpipe 220 just above the inlet of the sealpot control valve 222. In an embodiment, the angle of the conical manifold 310 is taking advantage of the difference between solids and gas relative to the flow direction of solids within the standpipe 220 such that solids with high inertia momentum will preferentially move downward while gas with less inertia momentum is preferentially allowed to escape through the drain device 300. The excess gas removed from the standpipe may be extracted from the system or reinjected through a bypass conduit 314 that extends from the manifold 310 to a discharge passageway 316 of the sealpot control valve 222 adjacent to the downstream side of the orifice plate 226. As shown, the inlet of the bypass conduit 314 is positioned at a height above the outlet 312, while an outlet of the bypass conduit 314 is positioned at a height below the outlet 312. In an embodiment, the angle of the manifold 310 is approximately 30 degrees relative to a flow direction of the solids within the standpipe 220 for entrained solids to slide down.

In operation solids passing through the standpipe 220 are provided with grease gas 234 through inlets 228 in order to facilitate a flow through the standpipe 220 and to increase solids flow. As the flow of solids and gas passes the outlet 312 of the drain device 300, the solids, due to their size, density and downward inertia, continue downward and enter the sealpot control valve 222. Gas, however, exits the standpipe 220 through the outlet 312 and enters the cone-shaped manifold 310, as indicated by arrow 318. The removed gas 234, in most cases, then flows through bypass conduit 314 and into the downstream return leg 223, bypassing the sealpot 222 (or extracted from the system or reinjected into the system elsewhere). Removal of the gas 314 from the flow prior to the inlet of the sealpot control valve 222 (i.e., reducing the gas content of the flow) brings the solids flow back within a controllable range of the sealpot control valve 222. The solids that enter the sealpot control valve 222 are then fluidized and discharged to the riser 224 through the orifice plate 226 and return leg 223, as discussed above.

With further reference to FIG. 3, the bypass conduit 314 provides a passageway that allows gas to freely flow backward from discharge passageway 316 or return leg 223 to the standpipe 220, or forward from the standpipe 220 to the downstream side of the sealpot control valve 222 to reduce any surge of flow on the transport gas bed of the sealpot control valve 222 which would otherwise impede the ability to precisely control solids flow therefrom. This automatic or self-adjusting pressure balancing between the gas drain 300 and the return leg 223 therefore provides a substantial pressure range within which flow control and pressure sealing within the sealpot 222 may be effected. In particular, a sudden surge of expanding and collapsing of the bed height within the sealpot may be eliminated as a result of this automatic-pressure balance feature, ensuring steady solids flow to the riser 210.

For example, in an embodiment, excess pressure within the riser 210 is permitted to pass freely from the riser 210, back to the drain device 300 and the standpipe 220 through the bypass conduit 314 (i.e., bypassing the sealpot 222). This is in contrast to existing systems where excess pressure within the riser 210 would typically backup within the sealpot 222, leading to undesirable backflow or, at minimum, a compressive gas force within the sealpot that could negatively impact solids fluidization or solids transport from the sealpot. By alleviating excess pressure within the riser by diverting gas within the riser to the standpipe, while bypassing the sealpot, any negative impacts on the operation or functioning of the sealpot are substantially obviated.

Moreover, as discussed above, excess standpipe gas or pressure within the standpipe 220 (e.g., as a result of injecting grease air into the standpipe 220 to facilitate solids flow) is also permitted to pass freely from the standpipe 220, to the return leg 223 and riser 210 through the bypass conduit 314. With existing systems, this standpipe gas or excess pressure cannot be easily alleviated, and is often provided directly to the sealpot, leading to a solids flow into the sealpot 222 that may be outside of a preferred operating range of the sealpot. The solids flow into the sealpot, with the excess standpipe gas, affects the ability to control the flow of solids out of the sealpot through the orifice plate 226. By removing the standpipe gas prior to the sealpot inlet utilizing the drain device 300, solids flow is brought back within a target operating range of the sealpot. As a result, solids flow out of the sealpot may be precisely controlled. In particular, the drain device 300 of the invention serves to separate the pressure balance between the riser and standpipe, and provides flow-control of solids, which provides the ability to better control the flow of solids at the fluidization and transport beds of the sealpot.

In an embodiment, the drain device 300 may also include a control valve positioned within the outlet 312 to regulate the amount of standpipe gas or other gas removed from the flow within the standpipe 220. Indeed, with or without a control valve, the drain device is operable to increase the solids to gas ratio of the flow prior to entering the sealpot.

Referring once again to FIG. 3, in an embodiment, the drain device 300 may include an bleed off conduit 320. The bleed off conduit 320 may be configured with a controllable valve and may be utilized in situations where it is desirable to remove gas from the system prior to it flowing through bypass conduit 314 and entering return leg 223. For example, the valve may be actuatable in order to divert the gas removed from standpipe/feedpipe 220 into bleed off conduit 320, such as in situations where it is undesirable to feed this gas back to reactor 210. In an embodiment, the gas removed from the system through conduit 210 may be diverted elsewhere for treatment, processing and the like.

While the embodiments above have been described with reference to chemical looping power generation systems, the invention is not limited in this regard. In particular, it is contemplated that the system and apparatus of the present invention may be utilized to control the flow of solids in any type of power generation process or system including, but not limited to, bubbling fluidized bed boilers and other variations of fluidized bed combustion power plants, as well as conventional power plants, and may, indeed, be utilized in any system where flow control of solid material and pressure balancing is desired.

In an embodiment, a system is provided. The system includes a standpipe for receiving a flow of solids therethrough, the standpipe having at least one inlet configured to receive a gas for decreasing a solids-to-gas ratio of the flow, a sealpot having an inlet fluidly coupled to the standpipe and an outlet fluidly coupled to a riser, the sealpot being configured to fluidize the solids received from the standpipe and to transport the solids to the riser, and a drain device fluidly coupled to an outlet in the standpipe, the outlet being located upstream from the inlet of the sealpot. The drain device is configured to remove the gas from the flow of solids within the standpipe to increase the solids-to-gas ratio of the flow prior to the solids entering the sealpot. In an embodiment, the outlet in the standpipe is located below the at least one inlet of the standpipe and above the inlet of the sealpot. In an embodiment, the drain device includes manifold for receiving the gas from the standpipe. In an embodiment, the drain device includes a bypass conduit fluidly coupled at one end to the manifold and at another end to the riser, the bypass conduit facilitating the free flow of gas between the riser and the standpipe. In an embodiment, the manifold is generally conical in shape. In an embodiment, a flow pathway defined by the manifold is oriented based on an angle of solids internal friction angle to take advantage of the momentum difference between gas and solids within the standpipe. In an embodiment, the system is part of a chemical looping power generation system or chemical reacting system. In an embodiment, the sealpot includes a fluidizing bed configured to fluidize the solids within the sealpot and a transport bed configured to transport the solids out of the sealpot and into the riser. The bypass conduit is configured to eliminate excess gas before the sealpot for control of solids flow and to smooth the flow due to a pressure difference between the riser and the standpipe. In an embodiment, the sealpot includes an orifice plate adjacent to the transport bed. The orifice plate includes a plurality of apertures disposed at a height above the transport bed, the plurality of apertures allowing transport of fluidized solids and gas through the plurality of apertures of the orifice plate from the transport bed to riser. In an embodiment, the drain device includes a control valve positioned within the outlet in the standpipe, the control valve being configured to regulate a flow of the gas out of the standpipe.

In another embodiment, a system for pressure balancing and controlling the flow of solids within a solids flow loop of a power plant is provided. The system includes a downcomer standpipe having an upper end, which receives solids of the power plant, a lower end, an inlet intermediate the upper end and the lower end and configured to receive a gas for passage into the flow of solids within the standpipe, and an outlet intermediate the inlet and the lower end of the standpipe, a sealpot having an inlet fluidly coupled to the lower end of the standpipe and an outlet fluidly coupled to a discharge passageway, the sealpot being configured to receive the solids from the lower end of the standpipe and to transport the solids to the discharge passageway, and a drain device fluidly coupled to the outlet in the standpipe and being configured to facilitate removal of the excess gas from the flow of solids within the standpipe. In an embodiment, the sealpot includes a fluidizing bed configured to receive fluidizing gas to fluidize the solids within the sealpot and a transport bed configured to transport the fluidized solids to the discharge passageway. In an embodiment, the drain device includes manifold for receiving the gas from the standpipe. In an embodiment, the drain device includes a bypass conduit fluidly coupled at one end to the manifold and at another end to the discharge passageway, the bypass conduit facilitating the free flow of gas between the discharge passageway and the standpipe while bypassing the sealpot. In an embodiment, the manifold is generally conical in shape. In an embodiment, a flow pathway defined by the manifold is oriented at an angle of approximately 30 degrees relative to a flow direction of the solids within the standpipe, to separate gas and solids effectively.

In yet another embodiment, a method of pressure balancing and controlling the flow of solids within a solids flow loop is provided. The method includes the steps of providing a supply of gas to a standpipe at an inlet to facilitate a flow of solids through the standpipe, removing at least a portion of the gas from the standpipe at an outlet positioned downstream from the inlet, and, after removing the gas from the standpipe, delivering the solids to a sealpot. In an embodiment, the method may also include the step of diverting the gas removed from the standpipe around the sealpot to a location within the flow loop downstream from the sealpot. In an embodiment, the method may further include the step of fluidly coupling the outlet of the standpipe to a riser of the flow loop, the riser being located downstream from the sealpot. The fluid coupling between the outlet of the standpipe and the riser facilitates a free flow of gas between the riser and the standpipe while bypassing the sealpot. In an embodiment, the method may also include the step of connecting a conical manifold to the outlet such that a flow pathway defined by the manifold is oriented at an upward angle of approximately 30 degrees relative to a downward flow direction of the solids within the standpipe.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system, method, and apparatus without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A system, comprising:
   a standpipe for receiving a flow of solids therethrough, the standpipe having at least one inlet configured to receive a gas for decreasing a solids-to-gas ratio of the flow;
   a sealpot having an inlet fluidly coupled to the standpipe and an outlet fluidly coupled to a riser, the sealpot being configured to fluidize the solids received from the standpipe and to transport the solids to the riser; and
   a drain device fluidly coupled to an outlet in the standpipe, the outlet being located upstream from the inlet of the sealpot;
   wherein the drain device includes a solids and gas separation device for receiving the gas from the standpipe, and a bypass conduit fluidly coupled at one end to the solids and gas separation device and at another end to the riser to facilitate the free flow of the excess gas between the riser and the standpipe, wherein the drain device is configured to remove excess gas from the flow of solids within the standpipe to increase the solids-to-gas ratio of the flow prior to the solids entering the sealpot.

2. The system of claim 1, wherein:
   the outlet in the standpipe is located below the at least one inlet of the standpipe and above the inlet of the sealpot.

3. The system of claim 1, wherein:
   the solids and gas separation device is generally conical in shape.

4. The system of claim 3, wherein:
   a flow pathway defined by the solids and gas separation device is oriented at an angle of approximately 30 degrees relative to a flow direction of the solids within the standpipe.

5. The system of claim 1, wherein:
   the system is part of a chemical reaction system.

6. The system of claim 1, wherein:
   the sealpot includes a fluidizing bed configured to fluidize the solids within the sealpot and a transport bed configured to transport the solids out of the sealpot and into the riser;
   wherein the bypass conduit is configured to transport excess gas in the standpipe and balance a pressure difference between the riser and the standpipe.

7. The system of claim 6, wherein:
   the sealpot includes an orifice plate adjacent to the transport bed;
   wherein the orifice plate includes a plurality of apertures disposed at a height above the transport bed, the plurality of apertures allowing transport of fluidized solids and gas through the plurality of apertures of the orifice plate from the transport bed to riser.

8. The system of claim 1, wherein:
   the drain device includes a control valve positioned within the outlet in the standpipe, the control valve being configured to regulate a flow of the gas out of the standpipe.

9. A system for pressure balancing and controlling the flow of solids within a solids flow loop of a chemical reaction system, comprising:
   a downcomer standpipe having an upper end, which receives solids of the power plant, a lower end, an inlet intermediate the upper end and the lower end and configured to receive a gas for passage into the flow of solids within the standpipe, and an outlet intermediate the inlet and the lower end of the standpipe;
   a sealpot having an inlet fluidly coupled to the lower end of the standpipe and an outlet fluidly coupled to a discharge passageway, the sealpot being configured to receive the solids from the lower end of the standpipe and to transport the solids to the discharge passageway; and
   a drain device fluidly coupled to the outlet in the standpipe and being configured to facilitate removal of the gas from the flow of solids within the standpipe, wherein the drain device includes a solids and gas separation device for receiving the gas from the standpipe, and a bypass conduit fluidly coupled at one end to the solids and gas separation device and at another end to the discharge passageway, the bypass conduit facilitating the free flow of excess gas between the discharge passageway and the standpipe while bypassing the sealpot.

10. The system of claim 9, wherein:
the sealpot includes a fluidizing bed configured to receive fluidizing gas to fluidize the solids within the sealpot and a transport bed configured to transport the fluidized solids to the discharge passageway.

11. The system of claim 9, wherein:
the solids and gas separation device is generally conical in shape.

12. The system of claim 11, wherein:
a flow pathway defined by the solids and gas separation device is oriented at an angle effective to separate solids and gas in the standpipe.

13. A method of pressure balancing and controlling the flow of solids within a solids flow loop, comprising the steps of:
providing a supply of gas to a standpipe at an inlet to facilitate a flow of solids through the standpipe;
removing at least a portion of the gas from the standpipe at an outlet positioned downstream from the inlet; and
diverting the gas removed from the standpipe around the sealpot to a location within the flow loop downstream from the sealpot.

14. The method according to claim 13, further comprising the step of:
fluidly coupling the outlet of the standpipe to a riser of the flow loop, the riser being located downstream from the sealpot;
wherein the fluid coupling between the outlet of the standpipe and the riser facilitates a free flow of gas between the riser and the standpipe while bypassing the sealpot.

15. The method according to claim 13, further comprising the step of:
connecting a conical solids and gas separation device to the outlet such that a flow pathway defined by the solids and gas separation device is oriented at an upward angle of approximately 30 degrees relative to a downward flow direction of the solids within the standpipe.

* * * * *